Nov. 27, 1928.  1,693,272
L. J. ELSAS ET AL
AUTOMATIC CONTROL FOR SHEET MATERIAL HANDLING MACHINERY
Filed March 7, 1924     4 Sheets-Sheet 1

INVENTORS
Louis J Elsas
Elmer M Jones,
By Bates & Macklin,
ATTORNEYS

Nov. 27, 1928.    1,693,272
L. J. ELSAS ET AL
AUTOMATIC CONTROL FOR SHEET MATERIAL HANDLING MACHINERY
Filed March 7, 1924    4 Sheets-Sheet 2
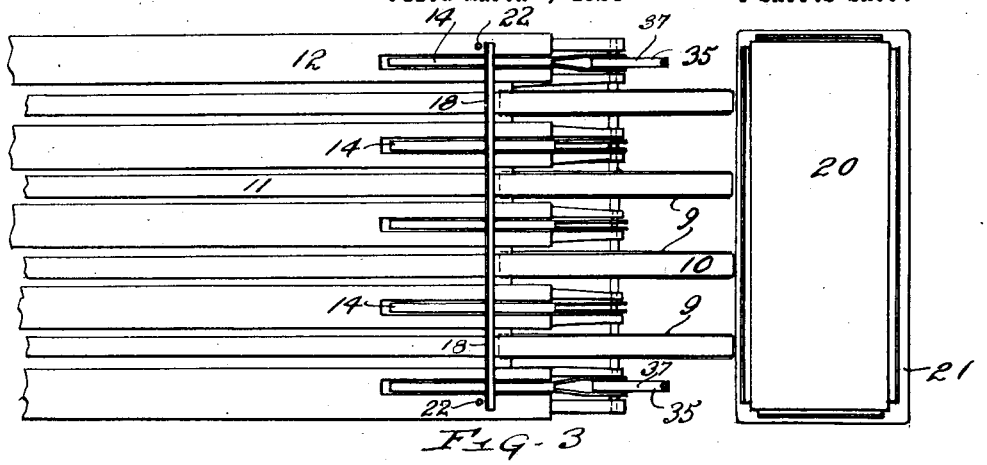
FIG-3
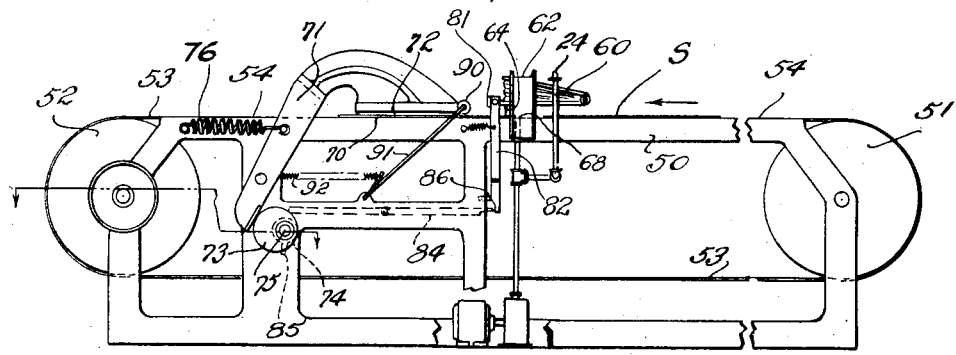
FIG-4
FIG-5
FIG-6
INVENTORS
Louis J. Elsas,
Elmer M. Jones,
By Bater Macklin

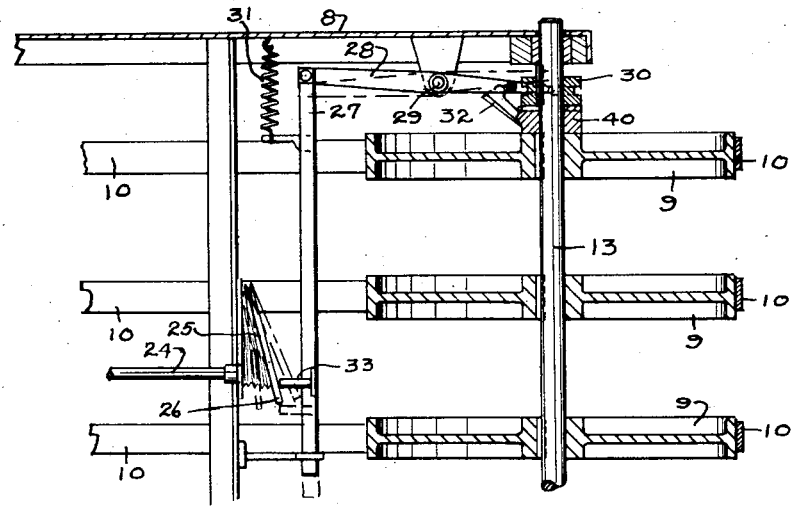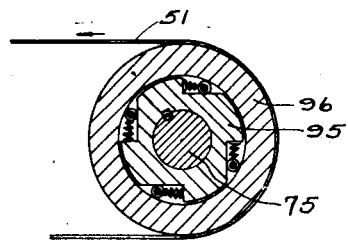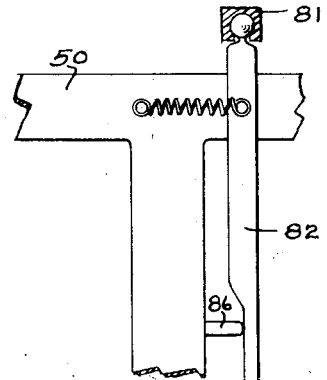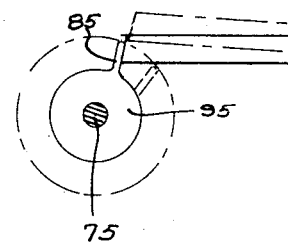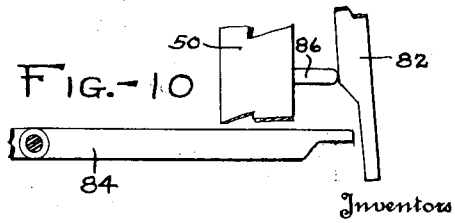

Nov. 27, 1928.  1,693,272
L. J. ELSAS ET AL
AUTOMATIC CONTROL FOR SHEET MATERIAL HANDLING MACHINERY
Filed March 7, 1924  4 Sheets-Sheet 4
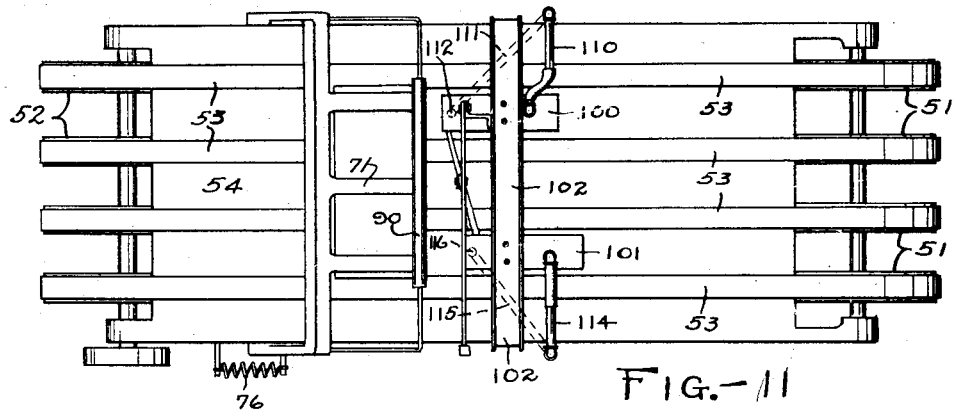
FIG.—11
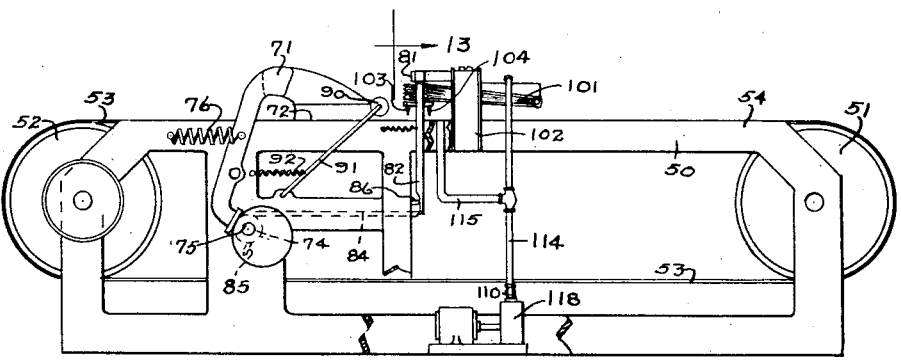
FIG.—12
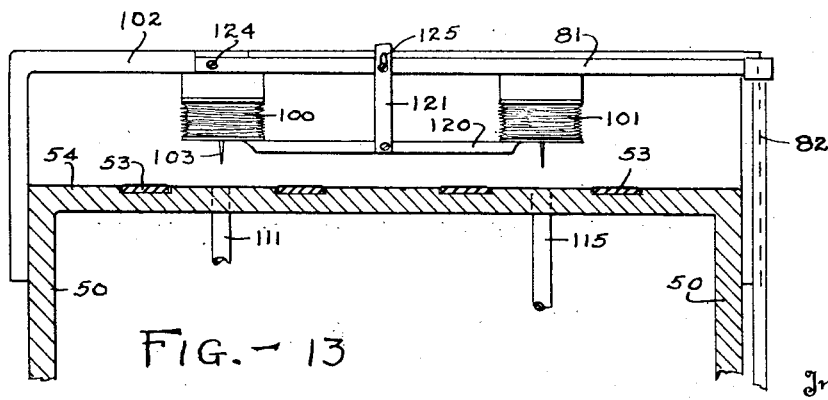
FIG.—13

Patented Nov. 27, 1928.

1,693,272

UNITED STATES PATENT OFFICE.

LOUIS J. ELSAS AND ELMER M. JONES, OF ATLANTA, GEORGIA; SAID JONES ASSIGNOR TO SAID ELSAS.

AUTOMATIC CONTROL FOR SHEET-MATERIAL-HANDLING MACHINERY.

Application filed March 7, 1924. Serial No. 697,506.

This invention is directed to improvements in pneumatically operated controls for associated mechanisms which are coordinated to function automatically in effecting various operations upon work or material being conveyed through the mechanism.

The general object of our invention is the provision of a pneumatically actuated control which is operable to effect the starting, stopping or regulating of associated mechanisms in timed relation to the movement of the material being operated upon.

A further object of our invention is the provision of a mechanism which is operated consequent to the operation of other associated mechanism acting upon a sheet of material and which is responsive in its functioning to the presence, absence or relative movement of the material.

Other objects of my invention will be hereinafter set forth in the following description referring particularly to the accompanying drawings which illustrate the ready adaptability thereof to various mechanisms each being applicable to a different manufacturing purpose. The essential characteristics are summarized in the claims.

Figure 1:
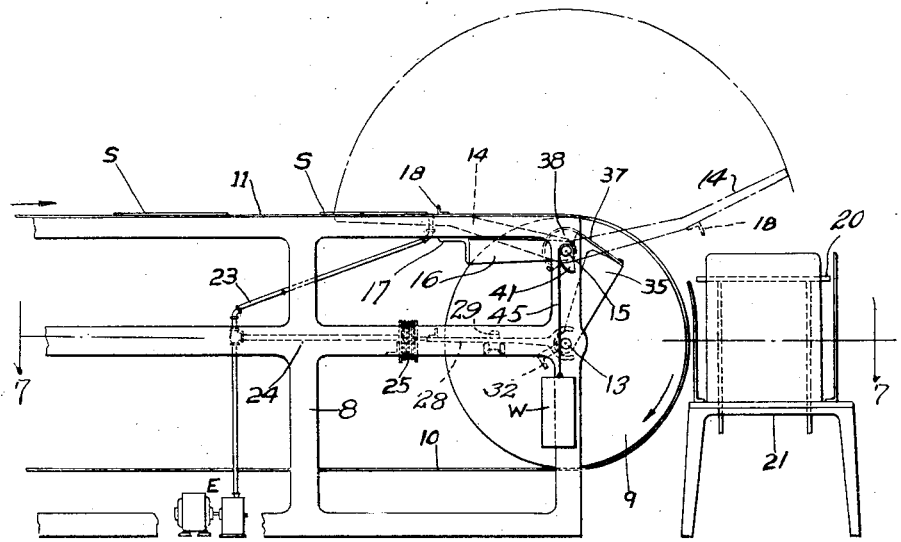
Figure 2:
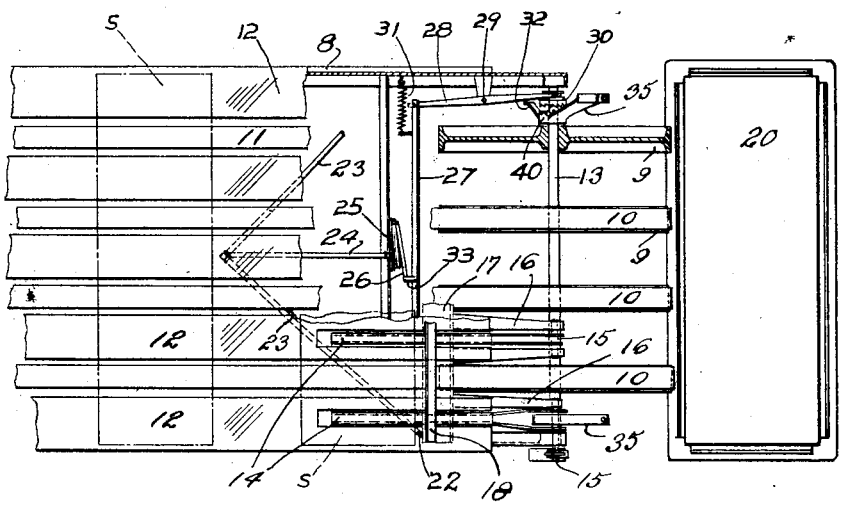

Referring to the drawings in Figs. 1, 2, and 3, we show our invention as embodied in a device adaptable for the conveying and stacking of sheet material, Fig. 1 being a side elevation; Fig. 2 a plan partly sectional and Fig. 3 a top plan; Fig. 4 is a side elevation of a machine embodying a form of our invention which is adapted to control the movement of a sheet of material and to initiate mechanism to act thereon, as for example a printing mechanism; Fig. 5 is a plan view of the mechanism illustrated in Fig. 3; Fig. 6 is a detail of the printing mechanism shown in Figs. 4 and 5; Fig. 7 is a horizontal section on the line 3—3 on Fig 1; Fig. 8 is a vertical section on the line 8—8 on Fig. 6, illustrating the clutch; Fig. 9 is a diagrammatic elevation of the operating levers for controlling such clutch; Fig. 10 is a fragmentary view of a portion of Fig. 9, with the parts in different position; Fig. 11 is a plan of an embodiment of the machine similar to Fig. 5, except employing two bellows, each controlling an impaling pin; Fig. 12 is a side elevation of the embodiment shown in Fig. 11; Fig. 13 is an enlarged transverse section on the line 13—13 in Fig. 12.

Our invention is particularly adaptable to those classes of machines wherein a conveyor or transporting mechanism is utilized to convey a sheet or web of material upon which various operations are being effected during its progress through the machine. But, as will be hereinafter set forth, our invention may be embodied in various forms adaptable to the control of other mechanisms which do not of necessity embody a conveyor for carrying the material. While we have shown such other mechanisms as comprising in one instance a stacking mechanism and in another a printing mechanism it is to be understood that these are illustrative of any mechanism which may act on the material controlled.

The sheet transferring and stacking mechanism illustrated in Figs. 1, 2 and 3 may comprise substantially a machine frame 8 provided with a table 12 over which or adjacent to which may extend top stretches 11 of conveyer bands 10. These bands may extend over drums 9 carried by a shaft member 13 suitably bearing on the frame 8 of the machine. At the right of the machine frame 8, we show a sheet receiving table 20 vertically adjustable on a stationary support 21. Upon this table the sheets may be stacked when transferred from the conveyer bands or the table 12 by a flier, comprising arms 14 mounted on individual shafts 15 carried by brackets 16 mounted on a cross frame member 17 of the machine. The flier is braced by the stop rail 18. The operation of the flier may be determined by the movement of the sheet S which is effected by the top stretches of the conveyor bands 10, when the sheet engages the stop rail 18, as hereinafter explained. The rocking movement of the flier may be effected by any convenient mechanism actuated by the drum shaft 13 and this mechanism may be controlled by a pneumatically operated tripping device which is operated when a sheet S is conveyed along the table 12 by the conveyer bands until the forward edge thereof abuts the stop rail.

The stop rail 18 is positioned to lie adjacent a pair of ports 22 when the arms 14 are swung to the left in juxtaposition to the table 12. These ports become effectively sealed by the sheet S when the latter is in abutting relation to the stop rail. The ports constitute inlets for a vacuum system comprising pipe lines 23 connecting the ports to a vacuum pump indicated at E, and a branch line 24 communicating with a bellows 25 which actuates a trip or latch 26 mounted thereon.

Actuation of the latch 26 determines the actuation of the flier by the drum shaft 13 through convenient mechanism which may comprise a transverse bar 27, a lever member 28 suitably mounted at 29 upon the machine frame, and a dental clutch member 30 splined upon the shaft 13 and engageable with a clutch member 40 which is loose on the shaft. A spring member 31 tends to move these members in the clutch engaging direction, while an arm 32, rigidly mounted on the clutch member 40 serves subsequently to cam them in the opposite direction, whereupon a pin 33 mounted on the bar 27 is caused to be engaged by the bellows trip latch 26.

A preferred means for positively transmitting motion from the shaft 13 to the flier frame may comprise an arm 35 rigidly mounted on the clutch member 40 and to the outer end of which may be connected a flexible band 37 having a portion thereof wound upon a segment member 38 rigidly mounted on one of the rocker shafts 15.

It will be seen that when the dental clutch 30 is caused to engage the cooperating clutch member 40, the arm 35 is swung downwardly, thus causing the band 37 to actuate the flier until the arm 32 causes the lever 28 to disengage the clutch members, which are then held disengaged by the latch 26. Any convenient means may be provided for returning the flier from the right to the left, and such means may comprise a segment member 41 rigidly mounted upon one of the rocker shafts 15, which, when the rocker shaft is operated, positively winds a tape 45 with a variable moment radius to raise a weight W attached to the lower end of the tape 45. Upon release of the clutch the weight W will return the frame to a sheet receiving position.

In this form of our invention it will be seen that when the sheet S abuts the stop bar 18, the ports 22 become sealed and the bellows 25 is collapsed, thereby releasing the pin 33 and bar 27; thereupon the flier is actuated to raise the material from the bed of the machine, thus unsealing the ports 22. The bellows 25 immediately expand, conditioning the latch member 26 carried by the bellows 25 to engage the pin 33 when the bar 27 is positively actuated by the arm 32. It will be noted that, regardless of the intermittent feeding or variable spacing of the sheet S upon the conveyer bands 10, the flier will not be operated until a sheet abuts the stop bar 18. Furthermore, if the sheet is not accurately true when it abuts the stop bar only one port 22 will be first covered but this will not operate the bellows until the conveyer belts have brought the sheet to cover the other port also, which necessitates the entire front edge of the sheet abutting the stop bar.

It will be noted that a machine equipped with such a pneumatic control as described would not necessitate the design and construction of a delicate or light tripping mechanism sufficiently sensitive to be mechanically responsive to the movement or presence of a sheet of material of comparatively light weight. Furthermore, a simple transferring mechanism may be associated with such a control which need not involve the use of intricate or expensive parts.

In Figs. 4, 5 and 6, we show an adaptation of our invention to a device which is arranged to directly engage a sheet of material being conveyed through a machine, control its movement and effect a printing impression thereon. The machine is diagrammatically illustrated as comprising a frame 50, conveyer drums 51 and 52 disposed at each end thereof (one set of which may be positively driven) and endless conveyer bands 53 extending thereover and over the top surface of the table portion 54 of the machine frame. The sheet arresting mechanism may comprise a simple form of bellows operated device consisting of a bellows 60 mounted upon a bracket 62 above the table surface in the longitudinal central line thereof and over a space between the conveyer bands 53. The sheet arresting or contacting member may comprise a pin 64 mounted upon the under movable wall of the bellows 60. The disposition of the pin 64 and the bellows 60, of course, would be dependent upon other mechanisms associated with the machine frame which are to perform certain operations upon the sheet as it is being moved by the conveyer band 50 or when being prevented from moving by the pin 64.

It should be noted that when pin 64 impales the sheet, the continued pull of the conveyer belts will swing the sheet into a straight location, if it is not already in such position. On the other hand, should it be desired to swing a sheet out of a straight location, this may be accomplished by providing two impaling pins and operating bellows adapted to engage the sheet near its respective edges, and controlled by two vacuum ports, one of which is somewhat in advance of the other. With such arrangement, when the first port is uncovered, its pin impales one of the rear corners of the sheet and then the advancing belts tend to swing such sheets about such pin as a center until the other port is uncovered. An embodiment involving these features is shown in Figs. 11, 12 and 13 and will be hereinafter described.

In Figs. 4, 5 and 6, we have shown the bellows controlling a printing mechanism to print on the sheet while it is held in position by the impaling pin 64. The printing mechanism shown comprises a bed 70, an operating arm 71, a printing face 72 carried thereby, a cam 73 acting on the arm 71 and clutch 74 for connecting the cam with a continuous rotating shaft 75. The clutch may be thrown into engagement by the action of the bellows 60 to which is connected a lever 81 and latch arm 82. The lower end of the latch arm engages a lever 84, one end of which stands in the path of a clutch release arm 85. The downward movement of said latch arm moves the lever 84 from contact with the clutch arm, and by reason of a knock-out pin 86 immediately thereafter disengages the lever 84 which drops back into the path of the released clutch arm, thereby insuring but one rotation of the clutch and cams. A friction clutch such as shown in Fig. 6 comprises an inner drum 95 keyed to the shaft 75 and engaging a recessed clutch member 96 loosely mounted on the shaft whenever the arm 85 is released. We have shown by way of illustration a felt inking roller 90, carried by an arm 91, drawn by a spring 92 toward the printing arm 71. When the printing arm rises under the influence of the cam 73, this spring causes the roller to travel across the type and ink it; then as the printing arm descends, the roller travels in the opposite direction across the type face and clears it before the face comes into engagement with the sheet to be printed.

It will be seen that the period of operation of the impaling pin 64 is determined solely by the period of time in which a sheet S is caused to traverse the port 68 when being moved by the conveyor bands 53 and that immediately upon the unsealing of the port by the moving sheet, the vacuum system will become open to the atmosphere, thus permitting the bellows 60 to expand, resulting in the pins 64 dropping and engaging the end of the sheet S. The sheet is thus held in arrested position upon the table until another approaching sheet, as it is being moved by the conveyor, seals the port 68. The bellows is thus contracted and the preceding sheet released, whereupon it may be conveyed out of the machine.

In this embodiment of our invention it will again be noted that the period of operation of the sheet arresting means is dependent upon the relative movement of the sheet while over the vacuum inlet and that the sheet controlling mechanism functions to release a sheet only when another sheet is brought into proximity to the inlet port by the conveyer.

Figs. 11, 12 and 13 illustrate an embodiment of the invention similar to that just described with reference to Figs. 4, 5 and 6, except that in place of one bellows controlling one impaling pin, we provide a pair of bellows each controlling an impaling pin, one pin being located slightly in advance of the other. This arrangement may be used for instance to automatically skew a sheet which is fed straight by the conveyor. As soon as one port is uncovered, its pin will be brought down by the actuated bellows and impale the adjacent corner of the sheet and the conveyor belts will then swing the sheet around about that pin as a center until the other port is uncovered, whereupon the second bellows operates and impales that corner of the paper and holds it. Both bellows are connected with the clutch releasing lever, but the movement of whichever one takes place first is idle in this regard, the last one taking up the slack and operating to release the clutch.

In Figs. 11, 12 and 13 the conveyor, the printing device, the cams, clutch for operating them, and the release lever for the clutch is the same as described with reference to Figs. 4, 5 and 6, and bear the same reference numerals. These views however disclose two bellows designated 100 and 101, both supported by a cross bar 102 above them. The lower leaf of each bellows is free for movement and carries an impaling pin as 103 or 104. The bellows 100 is shown connected to a suction pipe 110, having a branch 111 leading to a port 112, while the bellows 101 has a suction pipe 114 with a branch 115 leading to a port 116. Both suction pipes go to a suction pump 118.

The bellows 100 and 101 are shown as connected by a cross-bar 120, the central point of which is connected by a link 121 with the clutch lever 81 pivoted at 124 and connected at its free end to the depending link 82 as already described. A slot 125 in the link 121 provides a loose play between that link and the lever 121. Due to this loose play, the first bellows to descend (irrespective of which one it is) simply takes up this slack, then when the second bellows acts, the lever 81 is drawn downwardly shoving the link 82, which, as heretofore described, operates the lever 84 of Figs. 9 and 10 to release the clutch and cause the printing or other action on the paper.

It will be obvious from the entire description of our invention that any number of associated mechanisms of any suitable character may be controlled in timed relation to the actuation of the pneumatically operated mechanisms and that our invention is not limited to stacking mechanisms, printing mechanisms, or any other specific kind of mechanism, controlled by the pneumatic action. We may cause various operations to take place upon a sheet or fabric as it passes ports along its travel during process of being manufactured into finished products. Likewise we may have the fabric control the introduction to the machine of other pieces of fabric, or cause operations to take place upon a second fabric which may not yet have reached a port. If desired, the subsequent mechanisms may be electrically actuated by simply associating switches or relays with the bellows, which would be operated thereby when the inlet ports become sealed by the material being conveyed by the machine.

We claim:

1. In an apparatus of the character described, the combination of a conveyer for intermittently progressing sheet material, a vacuum line having a vacuum port associated with the conveyer and disposed adjacent the path of movement of the sheet material, a suction device connected to the vacuum line, and means arranged to perform an operation on the sheet material, said means being pneumatically started in movement by the presence of the sheet across the vacuum port.

2. In an apparatus for effecting one or more operations upon a sheet of material, the combination of a conveyer for said material, a device adapted to be moved pneumatically, a controlling conduit therefor associated with said mechanism in such manner that its periods of operation are dependent upon the relative movement of the sheet thereto, and other mechanism associated with said conveyer and varied in movement by said pneumatically operated device for performing an operation on the sheet.

3. In an apparatus of the character described, the combination of a mechanism for effecting various operations upon a sheet of material including a conveyer for said material, a device adapted to be moved pneumatically, a controlling conduit therefor associated with said mechanism in such manner that each period of its operation is dependent upon the relative movement of the sheet thereto, and other mechanism associated with said conveyer and caused to move by said pneumatically operated device when a sheet is present, for controlling the progress of the sheet.

4. An apparatus adapted to be associated with a machine for effecting operation upon material, comprising a belt conveyer and a vacuum system including a port adapted to be sealed by the material while the material is being moved by the conveyer, and controlling means started in movement by the vacuum system when the material is present for affecting the material.

5. An apparatus for handling individual sheet material comprising a conveyer, a constantly exhausted vacuum system having an inlet port disposed adjacent the conveyer in such position as to be sealed by the sheet material when being moved by the conveyer, pneumatically operated control mechanism responsive to the presence of the material, and other mechanism acting on the sheet of material and controlled by said first named mechanism.

6. An apparatus for handling sheet material comprising a belt conveyer, a vacuum system having an inlet port disposed adjacent the conveyer in such position as to be sealed by the sheet material when being moved by the conveyer, a bellows-operated control mechanism, and other mechanism controlled by the bellows-operated mechanism acting on the sheet of material in timed relation to the movement of the material.

7. An apparatus for handling sheet material comprising a conveyer, a vacuum line having an inlet port disposed adjacent the conveyer in such position as to be sealed by the sheet material when being moved by the conveyer, a bellows connected to said line, a control means associated with the bellows, and mechanism controlled thereby for acting on the sheet of material in timed relation to the movement of the material when on the conveyer.

8. An apparatus for handling sheet material adapted to be associated with a machine for effecting an operation upon the material, in combination with a mechanism acting on the material to change its progress, a vacuum system including a port adapted to be sealed by a movement of the sheet material when being operated on by said mechanism, and bellows-operated means controlled by the vacuum system for controlling the operation of said mechanism acting on the sheet material.

9. An apparatus of the character described comprising a bellows, a conveyer for moving a sheet of material to be operated upon, associated mechanism for controlling the progress of the material being conveyed, and means responsive in its functioning to the movement of the material over a constantly exhausted inlet port controlling the ingress of air to the bellows, said last mentioned means controlling said associated mechanism.

LOUIS J. ELSAS.
ELMER M. JONES.